Nov. 27, 1956     R. CUMMINGS     2,772,142
PROCESSES OF RECLAIMING URANIUM FROM SOLUTIONS
Filed April 21, 1944
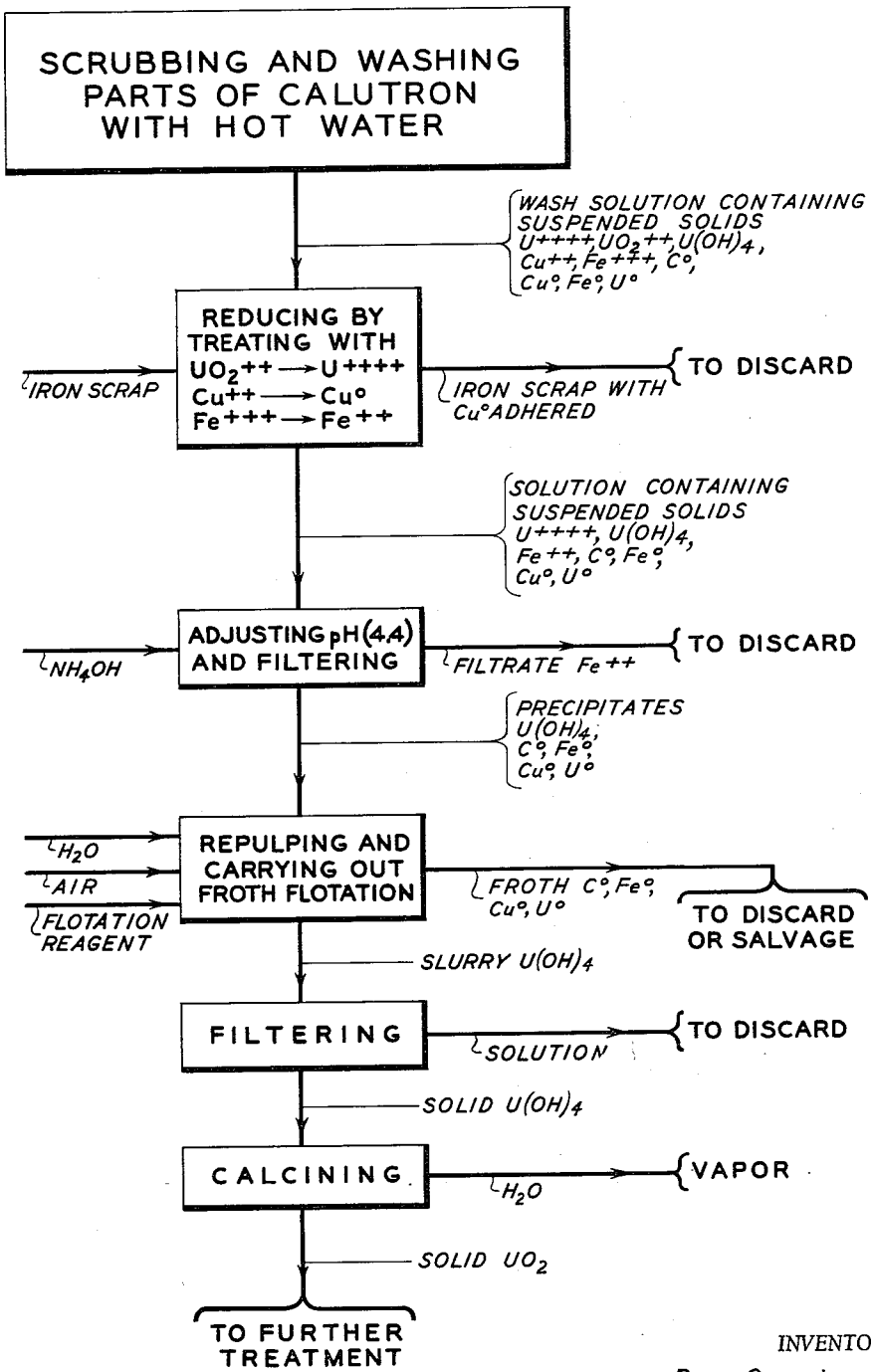
INVENTOR.
Ross Cummings
BY
ATTORNEY.

United States Patent Office 2,772,142
Patented Nov. 27, 1956

2,772,142

PROCESS OF RECLAIMING URANIUM FROM SOLUTIONS

Ross Cummings, Berkeley, Calif., assignor to the United States of America as represented by the United States Atomic Energy Commission Application April 21, 1944, Serial No. 532,161

8 Claims. (Cl. 23—14.5)

The present invention relates to processes of reclaiming uranium from a calutron and more particularly to improvements in certain steps of the process disclosed in the copending application of James M. Carter and Martin D. Kamen, Serial No. 532,159, filed April 21, 1944 which issued as Patent No. 2,758,006 on August 7, 1956.

It is an object of the invention to provide an improved process of reclaiming uranium from deposits in a calutron.

Another object of the invention is to provide an improved process of recovering the residue of a uranium compound that has been subjected to treatment in a calutron from the parts of the calutron disposed in the source region thereof upon which the residue is deposited.

A further object of the invention is to provide an improved process of purifying uranium that has been recovered from a calutron.

A further object of the invention is to provide a process of reclaiming uranium from a wash solution derived from a calutron in which the uranium is first precipitated as uranous hydroxide and then separated away from metal impurities in the solution by froth-flotation treatment.

The invention, both as to its organization and method of operation together with further objects and advantages thereof, will best be understood by reference to the following specification taken in connection with the accompanying drawing, in which the single figure is a flow diagram illustrating the process for recovering and purifying uranium from deposits formed in a calutron.

At the outset, it is noted that a "calutron" is a machine of the character of that disclosed in the copending application of Ernest O. Lawrence, Serial No. 557,784, filed October 9, 1944, which issued as Patent 2,709,222 on May 24, 1955, and is employed to separate the constituent isotopes of an element and more particularly to increase the proportion of a selected isotope in an element containing several isotopes in order to produce the element enriched with the selected isotope. Moreover, in such a machine, it is not essential that the material initially introduced be a naturally occurring polyisotope, such as naturally occurring uranium. It is feasible to separate any intermixed or intermingled materials capable of producing ions distinguishable from each other by differences in nuclear mass. Since this is true, it is not essential that the initial material mixtures be made up necessarily of the same chemical elements, as various different elements in intermixed form can readily be separated.

Such a calutron essentially comprises means for vaporizing a quantity of the material which is to be separated or of a material containing an element that is to be enriched with a selected one of its several isotopes; means for subjecting the vapor to ionization, whereby at least a portion of the vapor is ionized causing ions of the several isotopes of the element to be produced; electrical means for segregating the ions from the un-ionized vapor and for accelerating the segregated ions to relatively high velocities; electromagnetic means for deflecting the ions along curved paths, the radii of curvature of the paths of ions being proportional to the square roots of the masses of the ions, whereby the ions are concentrated in accordance with their masses; and means for de-ionizing and collecting the ions of the material or of the selected isotope thus concentrated, thereby to produce a deposit of the material or of the element enriched with the selected isotope.

When such a calutron is employed to separate the isotopes of uranium, the un-ionized portion of said material which is vaporized is deposited in the source region of the calutron and upon stainless steel surfaces while the ionized portion is deposited partially on the collector and partially upon various surfaces of the vacuum tank and other interior surfaces dependent upon the type of ion which is produced by said ionization and upon the operating characteristics of said calutron. It has been found convenient to employ uranium tetrachloride as the material being vaporized and, accordingly, there will be a deposit of the residue thereof formed in the source region of said calutron while metallic uranium comprising substantially only $U^{238}$ will be deposited in one pocket of the collector of said calutron and uranium enriched with $U^{234}$ and $U^{235}$ will be deposited in the second pocket of said collector.

In utilizing calutrons to effect the enrichment of uranium in a selected isotope, e. g., $U^{235}$, the plant includes a relatively large number of first-stage calutrons arranged in cascade with a relatively small number of second-stage calutrons. Singly enriched material from the first-stage calutron is recovered from the collector thereof, converted to $UCl_4$ and used as feedstock in the second-stage machine as disclosed in the aforesaid application of Carter and Kamen. Residual $UCl_4$ from the second-stage calutron source region and uranium from the first pocket of the second-stage collector is recovered and recycled as likewise disclosed therein. The uranium doubly enriched in $U^{235}$ is recovered from the second pocket of the second-stage calutron collector and converted to a standard compound of uranium for commercial use, also as described in the aforesaid application.

The solutions obtained in the recovery of the $UCl_4$ residue from the source region of the first-stage calutron is particularly suitable for treatment in accordance with the present invention. Considering now the details of the recovery of the $UCl_4$ residue from the parts of the first-stage calutron disposed in the source region thereof, reference is made to the flow diagram of the drawing. The parts of the calutron disposed in the source region thereof, principally the source-region end of the liner, are scrubbed and washed with hot water, whereby the residue of $UCl_4$ deposited thereon is dissolved; and various impurities including copper, iron and carbon are introduced in the water wash, due to the fact that the various parts of the calutron which are thus washed with hot water are formed of the materials mentioned. The uranium and impurities, both dissolved and suspended in the wash water, occupy various valence states, whereby the wash water may contain $UO_2^{++}$, $U^{++++}$, $Cu^{++}$ and $Fe^{+++}$ ions, the compound $U(OH)_4$, $C^0$ (carbon), and the metals $Cu^0$, $Fe^0$ and $U^0$. The wash water containing the dissolved and suspended materials mentioned is first reduced by agitating with iron scrap, whereby the uranyl ion, $UO_2^{++}$, is reduced to the uranous ion, $U^{++++}$, and the ferric ion, $Fe^{+++}$, is reduced to the ferrous ion, $Fe^{++}$, and the cupric ion, $Cu^{++}$, is completely reduced to the metallic state $Cu^0$. Most of the copper completely reduced to the metallic state, $Cu^0$, adheres to the iron scrap when the solution is decanted off therefrom, although some small portion of the completely reduced copper, $Cu^0$, is decanted off also.

The solution is decanted off from the iron scrap as noted, whereby it contains $U^{++++}$ and $Fe^{++}$ ions, the compound $U(OH)_4$ and the materials $C^0$, $Cu^0$, $Fe^0$ and $U^0$; and the iron scrap is discarded. The pH of the solution is raised to a value within the range 4.0 to 4.8, preferably to approximately 4.4, by the addition of ammonia, either in the form of gas or in aqueous solution, whereby the uranous ion, $U^{++++}$, is precipitated as $U(OH)_4$ away from the ferrous ion, $Fe^{++}$, in the solution. Thus the following materials appear in the precipitate in the solution: $U(OH)_4$, $C^0$, $Cu^0$, $Fe^0$ and $U^0$, the amount of uranium in the metallic state, $U^0$, being exceedingly small. The solution is then filtered and the precipitate is washed with an acid solution of HCl having a pH within the approximate range 3.5 to 5.0. The filtrate containing the ferrous ion, $Fe^{++}$, is discarded, and the precipitate containing $U(OH)_4$, $C^0$, $Cu^0$, $Fe^0$ and $U^0$ is then subjected to froth-flotation treatment.

More particularly, about four parts of water is mixed with about one part of the precipitate, whereby a slurry of suitable density is produced. The slurry is transferred to a flotation machine of the pneumatic type and a suitable amount of flotation reagent is added. Air is passed through the machine, whereby a froth develops as a head on the slurry. The froth carries away the $C^0$, $Fe^0$, $Cu^0$, $U^0$ and other gross impurities suspended in the slurry leaving the finely divided uranous hydroxide precipitate suspended in the slurry. The froth may be removed by a skimming operation. A suitable flotation reagent comprises a frothing agent such as pine oil, eucalyptus oil, or cresylic acid. The appropriate amount of flotation agent, as well as a specific type of agent, and the ratio of the amount of agent to the amount of slurry, as well as the preferred density of the slurry, may best be determined empirically by trial in a given flotation machine. However, satisfactory results may be obtained employing a pneumatic flotation cell holding a volume of slurry of about fifty gallons and to which is added about 0.3 pound of eucalyptus oil per ton of precipitate in the slurry of the above specified density.

After the froth carrying the $C^0$, $Fe^0$, $Cu^0$ and $U^0$ and gross impurities is separated from the slurry containing the uranous hydroxide, the froth is discarded or subjected to salvage treatment in order to recover the contained uranium; while the slurry is filtered in order to separate the uranous hydroxide precipitate from the water of the slurry. The filtrate is discarded and the $U(OH)_4$ precipitate is calcined in a non-oxidizing atmosphere, such as nitrogen or hydrogen, at approximately 250° C. in order to produce $UO_2$, water vapor being given off incident to the calcination. The uranium thus purified and in the compound form $UO_2$ is then converted back to $UCl_4$ for re-treatment in the first-stage calutron, as previously noted.

The present process of purifying the uranium contained in a wash solution derived from a calutron is advantageous, in view of its simplicity, although it does not accomplish quantitative purification of the contained uranium, as a minor fraction of the contained uranium is lost to the outside in the froth. Thus the present process is entirely satisfactory for the purification of a wash solution derived from the residue of $UCl_4$ deposited in the source region of the first-stage calutron, as such residue comprises uranium of natural or normal composition with respect to $U^{235}$. While the present process may be applied to the purification of such a wash solution derived from the residue of $UCl_4$ deposited in the source region of the second-stage calutron, such residue comprises uranium which is singly enriched with $U^{235}$, and therefore it is preferred to employ other methods for the recovery of this valuable material.

Consider now the details of the ultimate conversion of the $UO_2$, produced in the manner described above, back to $UCl_4$. More particularly, the $UO_2$ is reacted with $CCl_4$ in the vapor phase at approximately 450° C. in a suitable reaction chamber in order to produce crude $UCl_4$, whereby $COCl_2$, $CO_2$, CO and $Cl_2$ gases are given off incident to the reaction. The crude $UCl_4$ produced is then sublimed in a suitable molecular still at approximately 600° C. in order to produce a sublimate of $UCl_4$, whereby residues of $UO_2$ and $UOCl_2$ are produced incident to the sublimation. The residues of $UO_2$ and $UOCl_2$ are ultimately converted to $UCl_4$. The sublimate of $UCl_4$ thus produced is of very pure form and is suitable for recycling in the first-stage calutron in the manner previously explained.

In view of the foregoing, it is apparent that there has been provided an improved process of reclaiming uranium from a wash solution derived from a calutron, in conjunction with the calutron method.

Also, it will be understood that the present process may be suitably modified so that a compound of uranium other than $UCl_4$ may be treated either in the first-stage or in the second-stage calutron. For example, the calutron, as well as the conversion steps of the process may be modified, whereby $UCl_6$, $UBr_4$, etc. may be treated.

The term "uranium" is employed in the present specification and claims in a generic sense, i. e., as applying to uranium whether in elemental form or in the form of its compounds, unless indicated otherwise by the context.

While there has been described what is at present considered to be the preferred embodiment of the invention, it will be understood that various modifications may be made therein and it is intended to cover in the appended claims all such modifications as fall within the true spirit and scope of the invention.

What is claimed is:

1. A process for reclaiming uranium compound deposits from calutron parts, which parts contain a metal of the group consisting of copper and iron, which comprises washing said parts with a solvent for the uranium compound, thereby obtaining a solution of the uranium compound containing said metal as an impurity, treating the wash solution with iron scrap, whereby the uranium is reduced to its tetravalent state, drawing off the reduced solution, treating the reduced solution with ammonia to precipitate the uranium as uranous hydroxide in the solution, separating the uranous hydroxide precipitate and associated solid metal impurities from the solution, producing an aqueous slurry of the thus-separated uranous hydroxide and associated solid metal impurities, subjecting the slurry to froth-flotation treatment, whereby the solid metal impurities are carried away with the froth leaving the uranous hydroxide precipitate suspended in the slurry, and then separating the uranous hydroxide precipitate from the slurry.

2. A process for reclaiming uranium compound deposits from calutron parts, which parts contain a metal of the group consisting of copper and iron, which comprises washing said parts with a solvent for the uranium compound, thereby obtaining a solution of the uranium compound containing said metal as an impurity, reducing the wash solution, whereby the uranium is reduced to its tetravalent state, treating the reduced solution with ammonia to precipitate the uranium as uranous hydroxide in the solution, separating the uranous hydroxide precipitate and associated solid metal impurities from the solution, producing an aqueous slurry of the thus-separated uranous hydroxide and associated solid metal impurities, subjecting the slurry to froth-flotation treatment in the presence of eucalyptus oil as a frothing agent, whereby the solid metal impurities are carried away with the froth leaving the uranous hydroxide precipitate suspended in the slurry, and then separating the uranous hydroxide precipitate from the slurry.

3. A process for reclaiming uranium compound deposits from calutron parts, which parts contain a metal of the group consisting of copper and iron, which comprises washing said parts with a solvent for the uranium compound, thereby obtaining a solution of the uranium compound containing said metal as an impurity, subjecting the solution to a reducing treatment, whereby the uranium is reduced to its tetravalent state, treating the reduced solution with ammonia to precipitate the uranium as uranous hydroxide in the solution, filtering the solution in order to separate the uranous hydroxide precipitate and solid metal impurities leaving dissolved metal impurities in the filtrate, producing a slurry by adding water to the uranous hydroxide precipitate and the solid metal impurities, subjecting the slurry to froth-flotation treatment, whereby the solid metal impurities are carried away with the froth leaving the uranous hydroxide precipitate suspended in the slurry, and then separating the uranous hydroxide precipitate from the slurry.

4. A process for reclaiming uranium compound deposits from metallic surfaces containing a metal of the group consisting of copper and iron comprising washing the surfaces with a solvent to produce a solution containing uranium and said metals as impurities, treating said solution to reduce the uranium to the uranous state, treating the reduced solution to precipitate the uranium as uranous hydroxide in association with said impurities as solids, separating the uranous hydroxide and associated solid impurities from the solution, producing an aqueous slurry of the uranous hydroxide and solid impurities, subjecting the slurry to froth-flotation treatment, whereby the solid impurities are carried away with the froth leaving the uranous hydroxide in the slurry, and separating the uranous hydroxide from the slurry.

5. The process for reclaiming uranium compound deposits from metallic surfaces containing a metal of the group consisting of copper and iron comprising washing said surfaces with a solvent to form a solution containing uranium, whereby metal impurities including copper are introduced in the wash solution, treating the wash solution with iron scrap, whereby the uranium is reduced to the uranous state and the copper impurity is reduced completely to the metallic state, drawing off the reduced solution, whereby a major portion of the metallic copper impurity adheres to the iron scrap, treating the reduced solution with ammonia to precipitate the uranium as uranous hydroxide, separating the uranous hydroxide and associated solid metal impurities including copper from the solution, producing an aqueous slurry of the separated uranous hydroxide and associated metal impurities, subjecting the slurry to froth-flotation treatment, whereby the solid metal impurities are carried away with the froth with the uranous hydroxide remaining in the slurry, and then separating the uranous hydroxide from the slurry.

6. The process for reclaiming uranium from a solution containing uranium, iron, and copper ions comprising subjecting the solution to a reducing treatment to precipitate metallic copper and to reduce the uranium to the tetravalent state, treating the reduced solution with ammonia to precipitate the uranium as uranous hydroxide, separating the uranous hydroxide and associated metallic impurities from the solution, producing an aqueous slurry of the separated uranous hydroxide and associated metallic impurities, subjecting the slurry to froth-flotation treatment to remove the metallic impurities from the solution with the uranous hydroxide remaining in the slurry, and separating uranous hydroxide from the slurry.

7. The process of reclaiming uranium from an aqueous solution containing uranium, iron and copper ions comprising treating said solution with an excess of metallic iron to reduce the uranium ions to the uranous state, the iron ions to the ferrous state and to precipitate the copper ions in a metallic state in association with said excess iron, separating said excess iron from the solution, whereby some metallic iron and copper impurities remain in association therewith, treating the solution with ammonia to precipitate the uranium ions as uranous hydroxide in association with said impurities and away from the ferrous ions in solution, separating the uranous hydroxide and associated metal impurities from the solution, forming an aqueous slurry of said uranous hydroxide and metal impurities, subjecting the slurry to froth-flotation treatment to remove the metal impurities, and separating uranous hydroxide from the slurry.

8. A process for recovering residual uranium compounds of the class consisting of chlorides and bromides from deposits formed on metallic surfaces containing carbon and a metal selected from the group consisting of copper and iron comprising washing said surfaces with water to produce an aqueous solution containing uranium and said metals together with carbon as impurities, treating said solution with excess iron to reduce the uranium to the tetravalent state and dissolved iron and copper to the ferrous and metallic states respectively, separating the excess iron from the solution together with adherent metallic copper, adjusting the pH of the solution to the range of 4.0 to 4.8 to precipitate uranous hydroxide from the solution, filtering the precipitate from the solution and washing the precipitate with an HCl solution having a pH in the range of about 3.5 to 5.0, whereby $Fe^{++}$ ions in the solution are separated from the precipitate which contains $U(OH)_4$ and the elemental materials including C, Cu, Fe and U, subjecting the precipitate to froth flotation treatment, whereby said elemental materials are separated from the $U(OH)_4$ slurry obtained thereby, separating the $U(OH)_4$ from the slurry, and calcining the $U(OH)_4$ in an inert atmosphere to produce $UO_2$.

References Cited in the file of this patent

UNITED STATES PATENTS

| 2,040,187 | Rose | May 12, 1936 |
| 2,105,294 | Weinig | Jan. 11, 1938 |
| 2,106,887 | Earle | Feb. 1, 1938 |
| 2,231,265 | Gandin | Feb. 11, 1941 |

OTHER REFERENCES

Mellor: Comprehensive Treatise on Inorganic and Theoretical Chemistry, vol. XII, pp. 40–43. Copy in Div. 59.

Hopkins: "Chemistry of the Rarer Elements," pp. 303–305. Copy in Div. 59.